(12) United States Patent
Eden

(10) Patent No.: US 10,424,103 B2
(45) Date of Patent: Sep. 24, 2019

(54) DISPLAY DEVICE VIEWER GAZE ATTRACTION

(71) Applicant: Microsoft Technology Licensing, LLC, Redmond, WA (US)

(72) Inventor: Ibrahim Eden, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1350 days.

(21) Appl. No.: 14/265,103

(22) Filed: Apr. 29, 2014

(65) Prior Publication Data
US 2015/0310657 A1 Oct. 29, 2015

(51) Int. Cl.
G02B 27/01 (2006.01)
G06T 13/80 (2011.01)
G06F 3/01 (2006.01)
G06Q 30/02 (2012.01)
A63F 13/219 (2014.01)
(Continued)

(52) U.S. Cl.
CPC ............ *G06T 13/80* (2013.01); *A63F 13/213* (2014.09); *A63F 13/219* (2014.09); *A63F 13/426* (2014.09); *A63F 13/428* (2014.09); *G06F 3/013* (2013.01); *G06F 3/0484* (2013.01); *G06F 3/04812* (2013.01); *G06F 3/04815* (2013.01); *G06Q 30/0246* (2013.01);
(Continued)

(58) Field of Classification Search
CPC .............. G06F 17/00; A61B 3/14; G06K 9/00
USPC .............................. 705/14.4, 14.68; 351/210
See application file for complete search history.

(56) References Cited

U.S. PATENT DOCUMENTS 8,395,656 B1 3/2013 Malzbender et al.
8,493,390 B2 7/2013 Kalinli
(Continued)

FOREIGN PATENT DOCUMENTS

CN 102301316 A 12/2011
JP 2002133312 A 5/2002
(Continued)

OTHER PUBLICATIONS

ISA European Patent Office, International Search Report and Written Opinion issued in Application No. PCT/US2015/027186, dated Jul. 16, 2015, WIPO, 12 pages.
(Continued)

*Primary Examiner* — John Van Bramer
*Assistant Examiner* — Darnell A Pouncil
(74) *Attorney, Agent, or Firm* — Alleman Hall Creasman & Tuttle LLP

(57) ABSTRACT

Examples relating to attracting the gaze of a viewer of a display are disclosed. One example method comprises controlling the display to display a target object and using gaze tracking data to monitor a viewer gaze location. A guide element is displayed moving along a computed dynamic path that traverses adjacent to a viewer gaze location and leads to the target object. If the viewer's gaze location is within a predetermined divergence threshold of the guide element, then the display continues displaying the guide element moving along the computed dynamic guide path to the target object. If the viewer's gaze location diverts from the guide element by at least the predetermined divergence threshold, then the display discontinues displaying the guide element moving along the computed dynamic guide path to the target object.

20 Claims, 9 Drawing Sheets

(51) Int. Cl.
*A63F 13/428* (2014.01)
*A63F 13/213* (2014.01)
*A63F 13/426* (2014.01)
*G06F 3/0481* (2013.01)
*G06F 3/0484* (2013.01)
*G06K 9/00* (2006.01)

(52) U.S. Cl.
CPC ..... *G06Q 30/0273* (2013.01); *G06K 9/00604* (2013.01); *G06T 2213/12* (2013.01); *G06T 2215/16* (2013.01)

(56) References Cited

U.S. PATENT DOCUMENTS

| | | |
|---|---|---|
| 2006/0110008 A1 | 5/2006 | Vertegaal et al. |
| 2008/0309616 A1 | 12/2008 | Massengill |
| 2010/0056274 A1 | 3/2010 | Uusitalo et al. |
| 2010/0217656 A1* | 8/2010 | Bouget ............. G06Q 30/0241 705/14.4 |
| 2011/0128223 A1 | 6/2011 | Lashina et al. |
| 2012/0256967 A1 | 10/2012 | Baldwin et al. |
| 2012/0290401 A1* | 11/2012 | Neven .................... A61B 3/113 705/14.68 |
| 2013/0013204 A1 | 1/2013 | Kazama et al. |
| 2013/0054377 A1 | 2/2013 | Krahnstoever et al. |
| 2013/0127980 A1* | 5/2013 | Haddick ................ G06F 3/013 348/14.08 |
| 2013/0128364 A1* | 5/2013 | Wheeler ................ A61B 3/113 359/630 |
| 2013/0340005 A1 | 12/2013 | Kwan |
| 2014/0055591 A1 | 2/2014 | Katz |
| 2014/0092134 A1 | 4/2014 | Nagasawa et al. |
| 2014/0226131 A1* | 8/2014 | Lopez ................... G06F 1/1626 351/210 |

FOREIGN PATENT DOCUMENTS

| | | |
|---|---|---|
| JP | 2010244186 A | 10/2010 |
| JP | 2013521576 A | 6/2013 |
| JP | 2013210909 A | 10/2013 |
| JP | 2013232205 A | 11/2013 |
| JP | 2014067401 A | 4/2014 |
| RU | 2473301 C2 | 1/2013 |
| RU | 2013118993 A | 9/2013 |
| WO | 2010015962 A1 | 2/2010 |
| WO | 2013059940 A1 | 5/2013 |
| WO | 2013132886 A1 | 9/2013 |
| WO | 2013168173 A1 | 11/2013 |
| WO | 2013179424 A1 | 12/2013 |

OTHER PUBLICATIONS

"Notice of Allowance Issued in European Patent Application No. 15721448.7", dated Nov. 17, 2017, 7 Pages. (MS#340917-EP-EPT).

"Office Action Issued in Colombian Patent Application No. NC2016/0004483", dated Apr. 13, 2018, 16 Pages.

"Office Action Issued in European Patent Application No. 15721448.7", dated Oct. 19, 2017, 4 Pages. (MS#340917-EP-EPT).

"First Office Action and Search Report Issued in Chinese Patent application No. 201580022931.4", dated Aug. 29, 2018, 9 Pages. (MS#340917-CN-PCT).

"Office Action Issued in Mexican Patent Application No. MX/a/2016/014097", dated May 14, 2018, 4 Pages. (MS#340917-MX-PCT)(W/o English Translation).

"Notice of Allowance Issued in Russian Patent Application No. 2016142480", dated Nov. 12, 2018, 20 Pages. (MS#340917-RU-PCT).

"Office Action Issued in Israel Patent Application No. 248499", dated Nov. 28, 2018, 6 Pages. (MS#340917-IL-PCT).

"Office Action Issued in Japanese Patent Application No. 2016-560400", dated Feb. 12, 2019, 4 Pages. (MS#340917-JP-PCT).

* cited by examiner

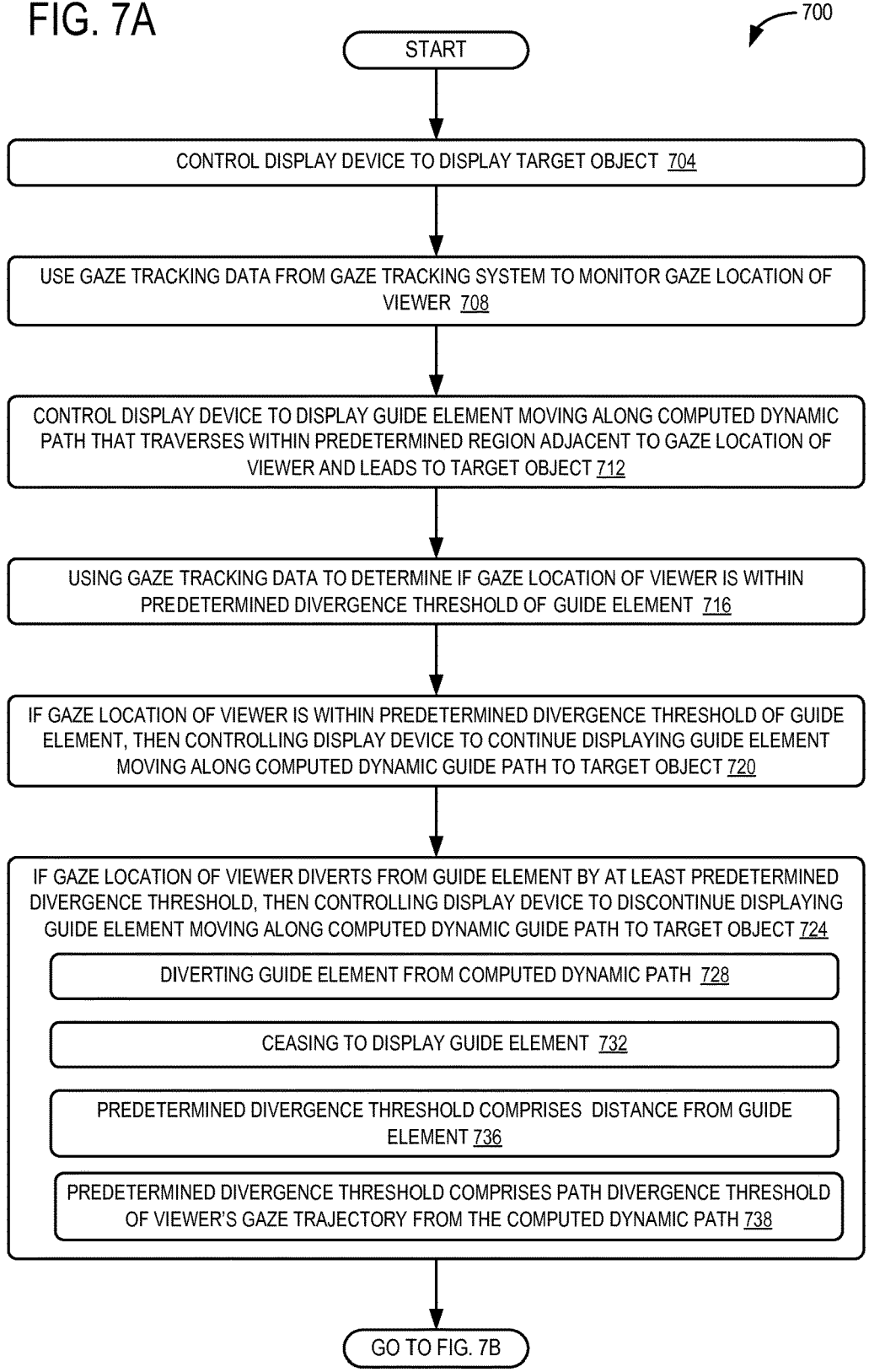

DISPLAY DEVICE VIEWER GAZE ATTRACTION

BACKGROUND

Content creation and/or delivery devices may utilize gaze tracking systems to track a location of a user's gaze. In some situations, a content creator such as a movie producer, advertiser, or game developer may desire to direct a user to look at a particular location or feature displayed via a display device. Using a gaze tracking system, a current location of a user's gaze may be estimated. If such current location does not correspond to the desired location or feature, the desired location or feature may be visually augmented in a prominent manner to capture the user's attention and gaze. For example, the desired location or feature may be highlighted in a bright contrasting color, made to visually pulsate or blink, and/or otherwise altered in appearance to draw the user's attention.

Augmenting a desired location or feature in this manner, however, may be distracting to the user and can interrupt an otherwise pleasurable user experience. Additionally, where the desired feature is an advertisement, the user may not appreciate being intentionally drawn away from the user experience to view the advertisement.

SUMMARY

Various examples are disclosed herein that relate to attracting the gaze of a viewer. In one disclosed method, a display device is controlled to display a target object and gaze tracking data from a gaze tracking system is used to monitor a gaze location of the viewer of the display. A guide element is displayed to move along a computed dynamic path that traverses within a predetermined region adjacent to the gaze location of the viewer and leads to the target object.

The gaze tracking data is used to determine if the viewer's gaze location is within a predetermined divergence threshold of the guide element. If the viewer's gaze location is within a predetermined divergence threshold of the guide element, then the display is controlled to continue displaying the guide element moving along the computed dynamic guide path to the target object. However, if the gaze location of the viewer diverts from the guide element by at least the predetermined divergence threshold, then the display is controlled to discontinue displaying the guide element moving along the computed dynamic guide path to the target object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A and 7B are a flow chart of a method for attracting the gaze of a viewer of a display device according to an example of the present disclosure.

DETAILED DESCRIPTION

Figure 1:
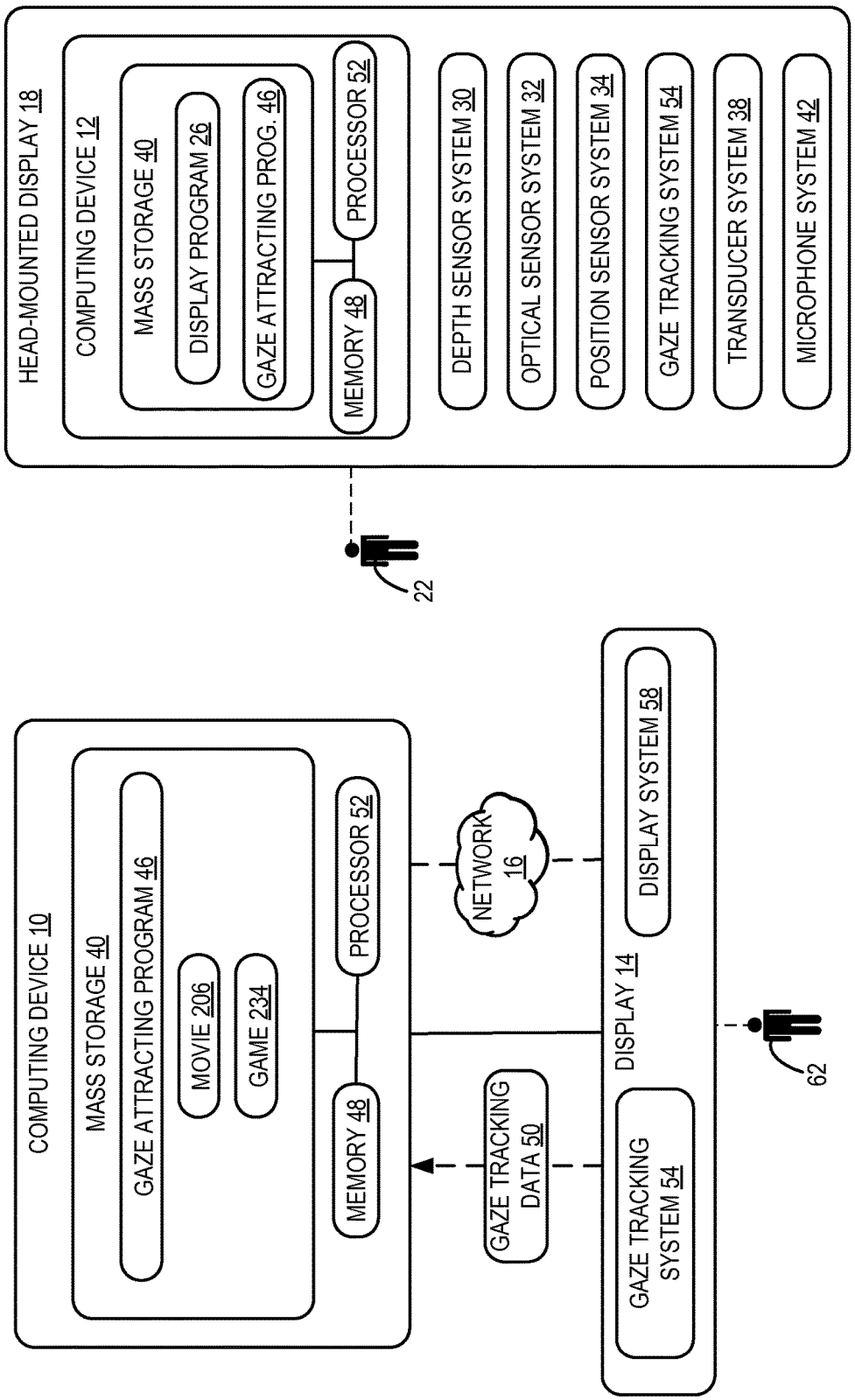
FIG. 1 is a schematic view of example computing devices that may be utilized with displays to attract the gaze of a viewer according to examples of the present disclosure.

FIG. 1 shows a schematic view of example implementations of a computing device for attracting the gaze of a viewer of a display device. As described in more detail below, the computing device uses gaze tracking data from a gaze tracking system to monitor the gaze location of the viewer. A gaze attracting program controls the display device to display a guide element moving along a computed dynamic path that traverses within a predetermined region adjacent to the gaze location of the viewer and leads to a target object. If the viewer's gaze stays with the guide element, then the guide element continues moving along the computed dynamic guide path to the target object. If the viewer's gaze diverts from the guide element by at least a predetermined divergence threshold, then the guide element is no longer displayed moving along the computed dynamic guide path to the target object.

In various examples, the computing device may be either physically separated from or integrated into a display device with which a viewer may interact. FIG. 1 schematically shows an example of a computing device 10 that is physically separated from a display device 14. In this example, the computing device 10 may comprise or be integrated into a separate device, such as a set-top box, gaming console, web camera, head-mounted computing device or other wearable computing device, keyboard, dedicated peripheral, or other like device that does not include an integrated display.

The computing device 10 may be operatively connected with the display device 14 using a wired connection, or may employ a wireless connection via WiFi, Bluetooth, or any other suitable wireless communication protocol. For example, the computing device 10 may be communicatively coupled to a network 16. The network 16 may take the form of a local area network (LAN), wide area network (WAN), wired network, wireless network, personal area network, or a combination thereof, and may include the Internet. Additional details regarding the components and computing aspects of the computing device 10 are described in more detail below with reference to FIG. 8.

FIG. 1 also shows an example of a computing device 12 integrated into a head-mounted display (HMD) device 18. The HMD device 18 may create and display to a first viewer 22 a virtual reality environment or a mixed reality environment. In these examples, the HMD device 18 may include a display program 26 that may generate the virtual environment or mixed reality environment for display via the HMD device. The virtual environment may include one or more visual elements in the form of virtual images, such as three-dimensional (3D) holographic objects and two-dimensional (2D) virtual images, that are generated and displayed via HMD device 18. In a mixed reality environment, the HMD device 18 may enable the viewer to view such holographic objects and virtual images within the physical environment surrounding the viewer.

As described in more detail below, in some examples the HMD device 18 may comprise a transparent, semi-transparent or non-transparent display that is supported in front of a viewer's eye or eyes. The HMD device 18 may include various sensors and related systems that receive physical environment data from a physical environment. For example, the HMD device 18 may include a depth sensor system 30 that includes one or more depth cameras that generate depth image data.

In some examples the HMD device 18 may include an optical sensor system 32 that utilizes at least one outward facing sensor, such as an RGB camera or other optical sensor. The outward facing sensor may capture two-dimensional image information from the physical environment. The HMD device 18 may also include a position sensor system 34 comprising one or more accelerometers, gyroscopes, head tracking systems, and/or other sensors for determining a position or orientation of a user.

The HMD device 18 may also include a transducer system 38 comprising one or more actuators that convert an electrical signal into another form of energy. In some examples, the transducer system 38 may include one or more speakers for providing audio feedback to a viewer. In other examples the transducer system 38 may include one or more tactile transducers for generating and providing haptic feedback to the viewer, such as vibrations. The HMD device 18 may also include a microphone system 42 and one or more microphones for receiving audio input from the physical environment.

Additionally, the example illustrated in FIG. 1 shows the computing device 12 integrated into the HMD device 18. It will be appreciated that in other examples the computing device 12 may be a separate component from the HMD device 18. Many types and configurations of HMD devices 18 having various form factors may be used and are within the scope of the present disclosure. A more detailed description of an example HMD device is provided below with reference to FIG. 6.

It also will be appreciated that the computing device 12 may comprise or be integrated into any other suitable type or form of display device, such as a tablet, notebook, smartphone, or other mobile computing device, desktop computing device, standalone monitor, wall-mounted display, interactive whiteboard, or other like device having an integrated display. Such devices may also include a gaze tracking system, as described in more detail below.

Both computing device 10 and computing device 12 may include a gaze attracting program 46 that may be stored in mass storage 40. The gaze attracting program 46 may be loaded into memory 48 and executed by a processor 52 to perform one or more of the methods and processes described in more detail below.

Computing device 10 and computing device 12 may receive gaze tracking data 50 from a gaze tracking system 54. In various examples the gaze tracking system 54 may be located in display device 14, HMD device 18, or in a common enclosure with any other suitable type or form of display device, including but not limited to those example devices having an integrated display discussed above. In other examples, the gaze tracking system 54 and computing device 10 may be integrated into a common enclosure that does not include an integrated display, such as a head-mounted or other wearable device, or in any other suitable type or form of computing device that does not include an integrated display, including but not limited to those example devices without an integrated display discussed above.

With continued reference to FIG. 1, the example display device 14 may include a display system 58 for presenting one or more visual elements to a second viewer 62. As described in more detail below, the gaze attracting program 46 may utilize gaze tracking data 50 from the gaze tracking system 54 to attract the gaze of a viewer via a guide element displayed by display device 14, HMD 18 or other display device.

Figure 2:
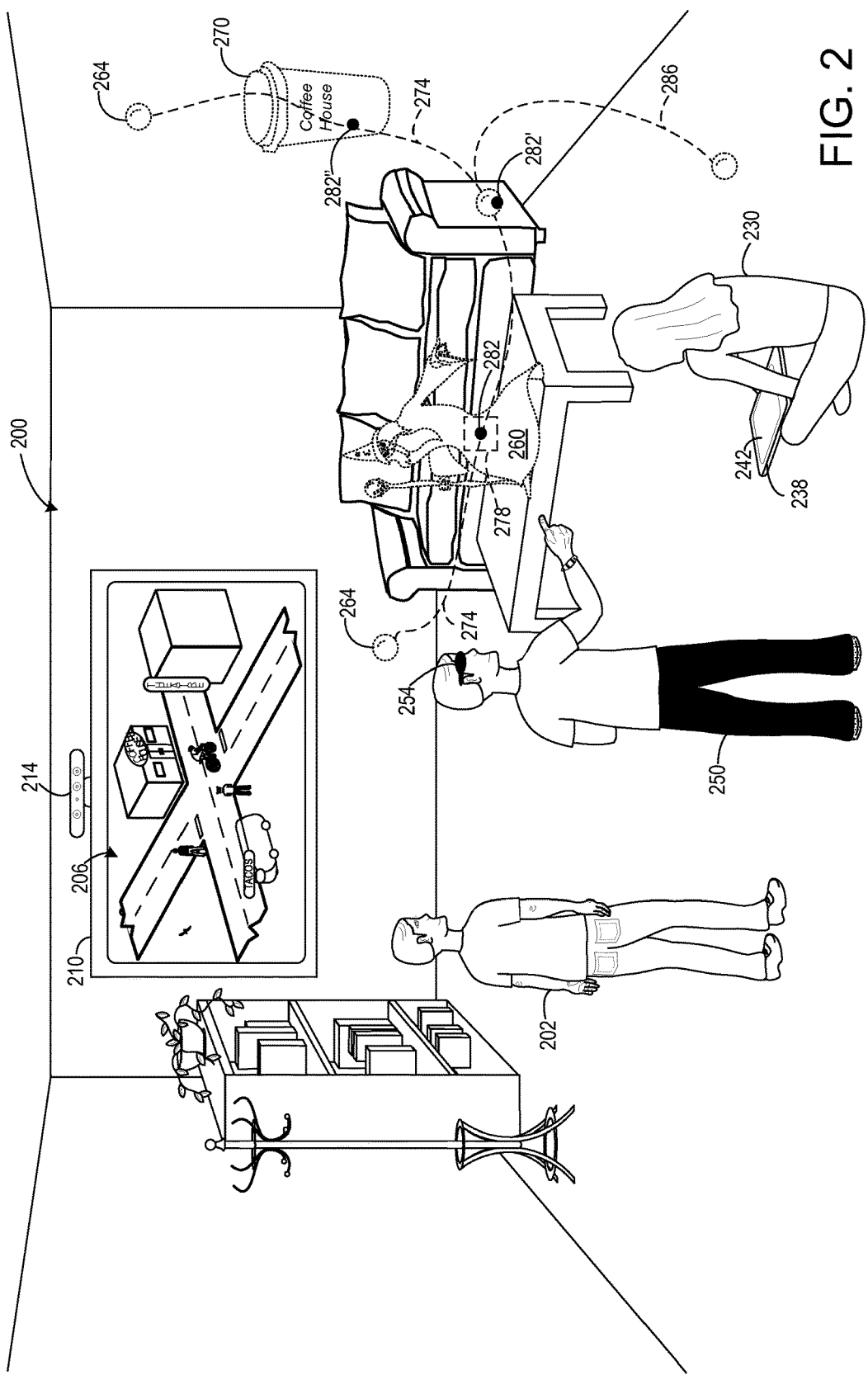
FIG. 2 is a schematic illustration of viewers in a room interacting with computing devices and displays that attract the gaze of a viewer according to examples of the present disclosure.

With reference now to FIGS. 2-5, descriptions of example use cases will now be provided. FIG. 2 is a schematic illustration of several viewers in a room 200 interacting with computing and display devices that use gaze tracking data from gaze tracking systems to attract the gaze of a viewer. In one example, viewer Alex 202 is watching movie 206 that is displayed on a wall-mounted display 210. In this example, wall-mounted display 210 is communicatively coupled to a set-top box 214 that comprises a gaze tracking system 54 and a computing device that includes gaze attracting program 46.

Figure 3:
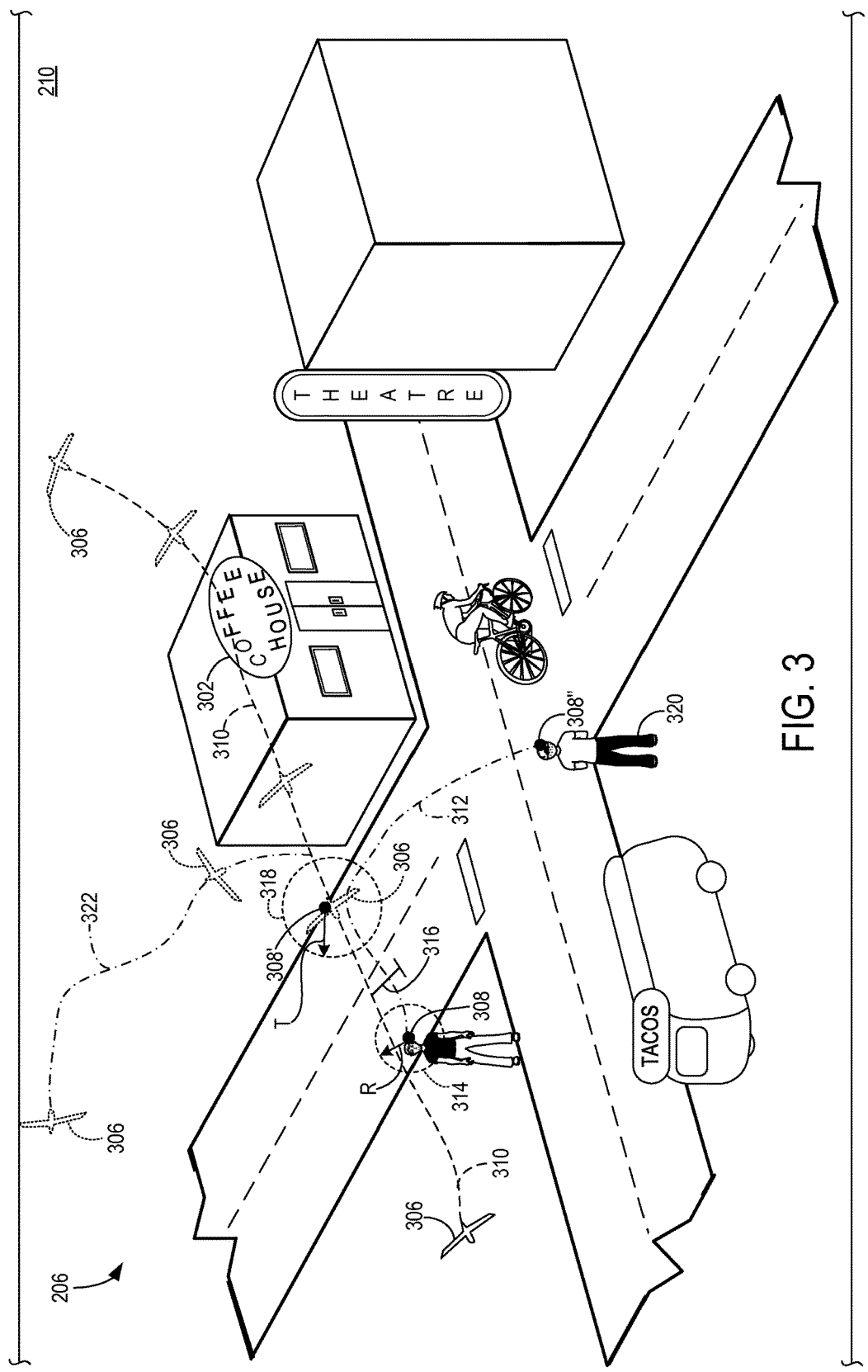
FIG. 3 is a schematic illustration of a movie displayed on a display device that may attract the gaze of a viewer according to an example of the present disclosure.

With reference now to FIG. 3, in one example the producers of movie 206 may desire to attract viewers' attention to a Coffee House 302 that is displayed in a scene of the movie. To attract viewers' attention, the gaze attracting program 46 may be configured to control the display device 210 to display a guide element. In this example, the guide element comprises a bird 306 that may be a computer-generated image that is added to the movie scene. Using gaze tracking data from the gaze tracking system 54, the gaze attracting program 46 may monitor the gaze location of viewer Alex 202 on the wall-mounted display 210. For example and as shown in FIG. 3, using gaze tracking data 50 the gaze tracking system 54 may determine that viewer Alex 202 is presently gazing at gaze location 308.

The bird 306 may be displayed to move along a computed dynamic path 310 that leads to the Coffee House 302. Further and to attract the attention of viewer Alex 202, the computed dynamic path 310 may traverse within a predetermined region 314 adjacent to the gaze location 308 of viewer Alex 202. Additionally and to minimize disruption or distraction of the viewing experience of viewer Alex 202, the dynamic path 310 may be computed in a manner that causes the movement of the bird 306 to appear natural and realistic. Advantageously, utilizing such a dynamic path 310 may enable viewer Alex 202 to continue watching and enjoying the movie 206 without feeling that his attention is being manipulated or intentionally diverted.

In some examples, the computer-generated bird 306 may be displayed to move along the computed dynamic path 310 according to computer-generated image movement rules that govern movement of computer-generated images that are rendered in real time in the movie 206. It will also be appreciated that the present example of a guide element in the form of bird 306 is provided for illustrative purposes, and that many other types, forms and examples of guide elements may be utilized and are within the scope of the present disclosure. For example and with reference to the movie 206, other computer-generated guide elements that might be utilized include, but are not limited to, a floating leaf, a person, a car, or any other suitable guide element.

In the example shown in FIG. 3, the predetermined region 314 adjacent to the gaze location 308 of viewer Alex 202 is a circle having a radius R that is concentric with the gaze location. The radius R may be determined in any suitable manner and may be based on, for example, one or more of a distance of viewer Alex 202 from the wall-mounted display 210, the size of the wall-mounted display, the size of one or more elements displayed on the wall-mounted display, the accuracy of the gaze tracking system 54, or any other suitable criteria. In various examples, the radius R may have a length of approximately 0.5 mm, 1.0 mm, 5.0 mm, 10.0 mm, 50.0 mm, 100.0 mm, or any other suitable distance. It will also be appreciated that any other suitable shape and/or configuration of a predetermined region adjacent to a gaze location of a viewer may also be used and is within the scope of the present disclosure.

With continued reference to FIG. 3, as the bird 306 travels along the computed dynamic path 310, the gaze attracting program 46 may determine if the gaze of viewer Alex 202 is following the flight of the bird. In one example, after the bird 306 passes by the gaze location 308, the gaze attracting program 46 may determine whether an updated gaze location 308' of viewer Alex 202 is within a predetermined divergence threshold of the bird 306.

In one example and as shown in FIG. 3, the updated gaze location 308' of viewer Alex 202 may be determined to be within a predetermined divergence threshold of the bird 306 when the updated gaze location is overlapping at least a portion of the bird 306. In another example, the updated gaze location 308' of viewer Alex 202 may be determined to be within a predetermined divergence threshold of the bird 306 when the gaze location is within a predetermined distance from the bird, though not necessarily overlapping the bird.

For example and as shown in FIG. 3, a predetermined divergence threshold 318 may comprise a circle having a radius T that is concentric with the updated gaze location 308'. As with radius R discussed above, the radius T may be determined in any suitable manner and may be based on, for example, one or more of a distance of viewer Alex 202 from the wall-mounted display 210, the size of the wall-mounted display, the size of the bird 306 and/or one or more other elements displayed on the wall-mounted display, the accuracy of the gaze tracking system 54, or any other suitable criteria. In various examples, the radius T may have a length of approximately 0.5 mm, 1.0 mm, 5.0 mm, 10.0 mm, 50.0 mm, 100.0 mm, or any other suitable length. It will also be appreciated that any other suitable shape and/or configuration of a predetermined divergence threshold may also be used and is within the scope of the present disclosure.

Where the updated gaze location 308' is within a predetermined divergence threshold the bird 306, the gaze attracting program 46 may control the wall-mounted display 210 to continue displaying the bird 306 moving along the computed dynamic path 310 to the Coffee House 302. Advantageously and in this manner, the gaze of viewer Alex 202 may be led to the Coffee House 302, thereby increasing Alex's awareness of the Coffee House. Additionally and as described in more detail below, in some examples the gaze attracting program 46 may also determine that the gaze location of viewer Alex overlaps the Coffee House 302, and in response may allocate an ad consumption charge to the Coffee House.

In another example, the gaze attracting program 46 may determine that the gaze location of viewer Alex 202 diverts from the bird 306 by at least the predetermined divergence threshold 318. Alternatively expressed and with reference to the example of FIG. 3, the gaze attracting program 46 may determine that the gaze location of viewer Alex 202 is outside of the circle indicated at 318. For example, the gaze attracting program 46 may determine that viewer Alex 202 returns his gaze to gaze location 308. In this example, the gaze attracting program 46 may control the wall-mounted display 210 to discontinue displaying the bird 306 moving along the computed dynamic path 310 to the Coffee House 302.

In another example, the gaze attracting program 46 may monitor and track a gaze trajectory 312 of viewer Alex's gaze location. In this example, a gaze location of viewer Alex 202 may be determined to be within a predetermined divergence threshold of the bird 306 when the gaze trajectory 312 is within a path divergence threshold 316 of the computed dynamic path 310. For example, after the bird 306 passes through the predetermined region 314 adjacent to Alex's gaze location 308, viewer Alex 202 may initially follow the bird's flight with his gaze such that his gaze trajectory 312 is within the path divergence threshold 316.

As shown in FIG. 3, in this example the path divergence threshold 316 is a distance between the gaze trajectory 312 and the computed dynamic path 310 at a given instance in time. In various examples, the path divergence threshold 316 may have a length of approximately 0.5 mm, 1.0 mm, 5.0 mm, 10.0 mm, 50.0 mm, 100.0 mm, or any other suitable length. It will also be appreciated that any other suitable comparison between the gaze trajectory 312 and the computed dynamic path 310 may be used to determine if viewer Alex's gaze is following the bird 306, and is within the scope of the present disclosure.

As discussed above, if the gaze attracting program 46 determines that the gaze trajectory 312 is within the path divergence threshold 316, the program may control the wall-mounted display 210 to continue displaying the bird 306 moving along the computed dynamic path 310 to the Coffee House 302. In another example, the gaze attracting program 46 may determine that the gaze trajectory 312 of viewer Alex 202 diverts from the computed dynamic path 310 by at least the path divergence threshold 316. For example, the gaze attracting program 46 may determine that viewer Alex 202 shifts his gaze to gaze location 308" as indicated by gaze trajectory 312. In this example, the gaze attracting program 46 may control the wall-mounted display 210 to discontinue displaying the bird 306 moving along the computed dynamic path 310 to the Coffee House 302.

In one example, the gaze attracting program 46 may discontinue displaying the bird 306 moving along the computed dynamic path 310 by diverting the movement of the bird to follow an alternative path 322 that does not lead to the Coffee House 302. In this manner, the gaze attracting program 46 may avoid displaying all guide elements traveling to a target object, even when a viewer is not gazing at the guide element. In other examples, the gaze attracting program 46 may discontinue displaying a guide element moving along a computed dynamic path by no longer displaying the guide element. For example, the gaze attracting program 46 may cause the guide element to disappear from the display.

In another example, the computed dynamic path 310 may be programmatically adjusted based upon a change in the gaze location of viewer Alex 202. For example, where viewer Alex 202 changes his gaze to an updated gaze location 308" at a bystander 320, the gaze attracting program 46 may programmatically adjust the computed dynamic path to traverse within a predetermined region adjacent to the updated gaze location 308" and then continue to the Coffee House 302.

Figure 4:
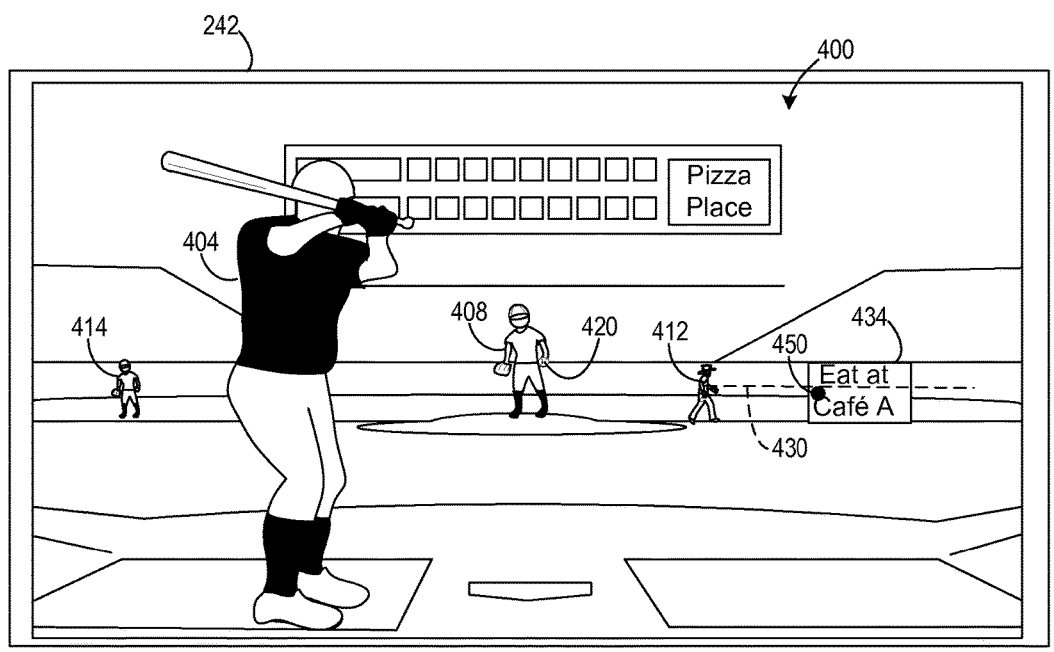
FIG. 4 is a schematic illustration of a game displayed on a display device that may attract the gaze of a viewer according to an example of the present disclosure.

In another example and with reference now to FIGS. 1 and 2, viewer Mary 230 may play a computer game 234 on her tablet computer 238. The tablet computer 238 may include a display 242, a gaze tracking system 54 and a gaze attracting program 46. With reference now to FIG. 4, in one example the computer game 234 comprises a baseball game 400 that includes a player character in the form of batter 404 that may be controlled by viewer Mary 230 and non-player characters in the form of pitcher 408 and outfielders 412 and 414 that move according to non-player character movement rules of the baseball game. The baseball game 400 may also include at least one object that moves according to object movement rules of the baseball game. In this example, the object may comprise the baseball 420.

In this example the guide element may comprise the pitcher 408, outfielder 412 and/or baseball 420. For example, the gaze attracting program 46 may control the display 242 of the tablet computer 238 to display the outfielder 412 moving along a computed dynamic path 430 according to the non-player character movement rules. The computed dynamic path 430 leads to the advertisement 434 that is located on the outfield wall and encourages viewer Mary 230 to "Eat at Café A." A gaze location 450 of viewer Mary 230 on the display 242 may be determined and monitored as described above. The movement of the outfielder 412 along the computed dynamic path 430 also may be controlled as described above.

In some examples, Café A may pay a promotional fee to have its advertisement 434 displayed in the baseball game 400. In one example, if the gaze attracting program 46 determines that the gaze location 450 of viewer Mary 230 overlaps the advertisement 434, then an ad consumption charge is allocated to Café A. Advantageously, in this manner the advertiser pays a per-impression ad consumption charge that is directly tied to actual viewer impressions of the advertiser's advertisement.

In another example, the promotional fee paid by Café A for their advertisement 434 may be at least partially based on a timeframe during which a viewer is gazing at the advertisement. For example, where the gaze location 450 of viewer Mary 230 overlaps the advertisement 434 for less than a predetermined timeframe, a first ad consumption charge may be allocated to Café A. Where the gaze location 450 of viewer Mary 230 overlaps the advertisement 434 for at least the predetermined timeframe, a second ad consumption charge that is greater than the first ad consumption charge may be allocated to Café A. In some examples, the predetermined timeframe may be 0.5 seconds, 1.0 seconds, 2.0 seconds, 5.0 seconds or any other suitable timeframe. Likewise, any suitable amounts may be utilized for the first and second ad consumption charges.

Figure 5:
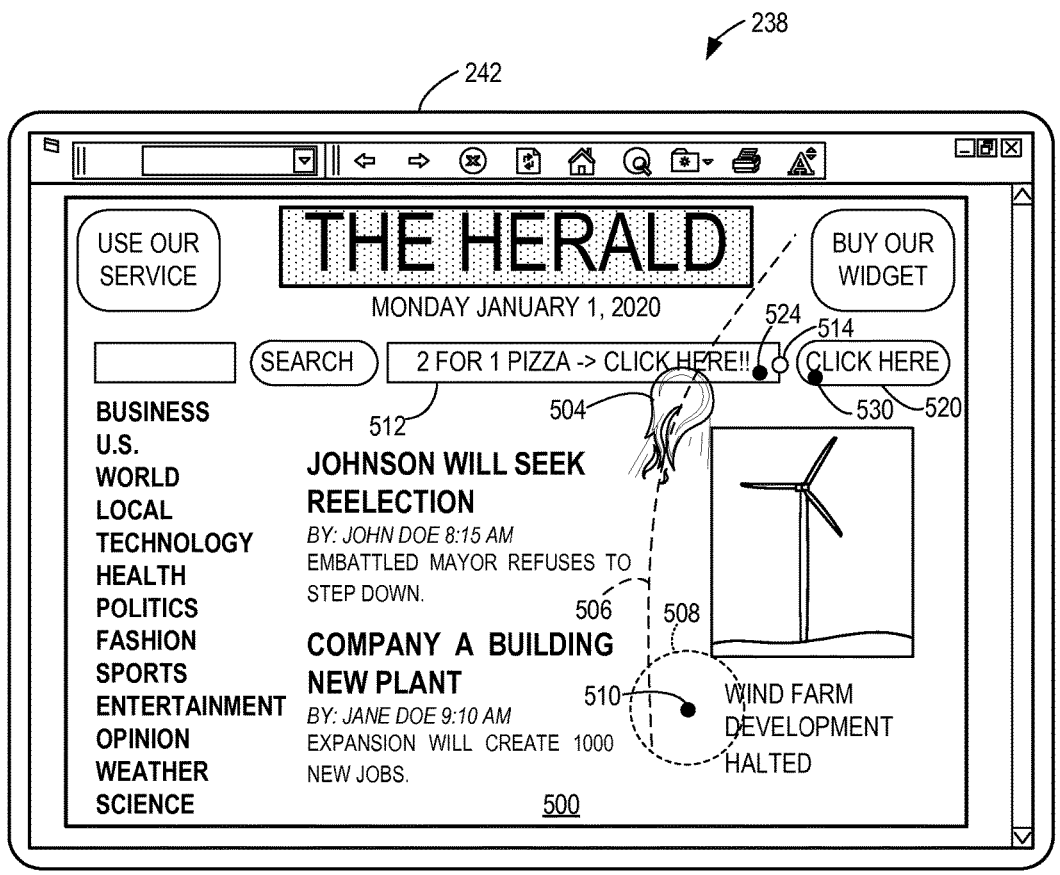
FIG. 5 is a schematic illustration of a web page displayed on a display device that may attract the gaze of a viewer according to an example of the present disclosure

With reference now to FIG. 5, in some examples the target object may comprise an advertisement that is displayed on a web page. For example, viewer Mary 230 may be viewing web page 500 on her tablet computer 238 that includes a touch-sensitive display 242. A guide element in the form of a streaking comet 504 may be displayed to move along a computed dynamic path 506 that traverses within a predetermined region 508 adjacent to a gaze location 510 of viewer Mary 230. The computed dynamic path may lead to a target object in the form of a selectable advertisement 512 announcing "2 For 1 Pizza" from Café A.

In one example, viewer Mary 230 may provide a viewer input associated with the selectable advertisement 512 by touching the screen of display 242. The location of her touch selection may be interpreted by the touch-sensitive screen as being located at a touch location point 514 that overlaps a portion of the advertisement 512. Accordingly, this viewer input selecting advertisement 512 may trigger an ad consumption charge that may be allocated to Café A.

However, in some examples viewer Mary 230 may not have intended to select the advertisement 512. For example, viewer Mary 230 may have larger-than-average fingers and may have intended to select the "Click Here" selectable button 520. The touch-detection system of the touch-sensitive display 242 may have misinterpreted the intended location of her touch as being located at point 514. To address this possibility, when the touch input of viewer Mary 230 is received and is associated with advertisement 512, the gaze attracting program 46 may determine if the gaze location of viewer Mary 230 overlaps the advertisement.

In one example, if a gaze location 524 of viewer Mary 230 overlaps the advertisement 512 when the viewer input is received, then the ad consumption charge is allocated to Café A. On the other hand, if a gaze location 530 of viewer Mary 230 does not overlap the advertisement 512 when the viewer input is received, then the ad consumption charge is canceled. Advantageously, in this manner inadvertent or unintended selections of selectable advertisements or other elements on a web page may be identified, and corresponding erroneous ad consumption charges and/or other unintended actions may be avoided.

In another example and with reference again to FIG. 2, viewer Wally 250 is wearing an HMD device in the form of a pair of glasses 254. Viewer Wally 250 is engaging in a mixed reality experience via the HMD glasses 254 that includes a holographic wizard 260 and a guide element in the form of a floating ball 264 that are displayed by the glasses.

In one example the developers of the mixed reality experience may desire to attract viewer Wally's attention to a holographic Coffee House advertisement 270 that is displayed in the room 20. As described above, the gaze attracting program 46 of the HMD glasses 254 may be configured display a guide element. In this example, the guide element comprises the floating ball 264. Using gaze tracking data from the gaze tracking system 54 of the HMD glasses 254, the gaze attracting program 46 may monitor the gaze location of viewer Wally 250.

The floating ball 264 may be displayed to move along a computed dynamic path 274 that leads to the Coffee House advertisement 270. As described above, the computed dynamic path 274 may traverse within a predetermined region 278 adjacent to a gaze location 282 of viewer Wally 250. As the floating ball 264 travels along the computed dynamic path 274, the gaze attracting program 46 may determine if the gaze location of viewer Wally 250 is within a predetermined divergence threshold of the ball. In one example, after the floating ball 264 passes the gaze location 282 the gaze attracting program 46 determines that an updated gaze location 282' of viewer Wally 250 is at the ball and within the predetermined divergence threshold. Accordingly, the gaze attracting program 46 may control the HMD glasses 254 to continue displaying the floating ball 264 moving along the computed dynamic path 274 to the Coffee House advertisement 270.

In other examples and as described above, the gaze attracting program 46 may also determine that another gaze location 282" of viewer Wally 250 overlaps the Coffee House advertisement 270, and in response may allocate an ad consumption charge to the Coffee House.

In another example, the gaze attracting program 46 may determine that the gaze location of viewer Wally 250 diverts from the floating ball 264 by at least a predetermined divergence threshold. In this example, the gaze attracting program 46 may control the HMD glasses 254 to discontinue displaying the floating ball 264 moving along the computed dynamic path 274 to the Coffee House advertisement 270. For example, the HMD glasses 254 may divert the floating ball 264 to move along an alternative path 286 that does not overlap the advertisement 270. In other examples, the HMD glasses 254 may cease displaying the floating ball 264.

Figure 6:
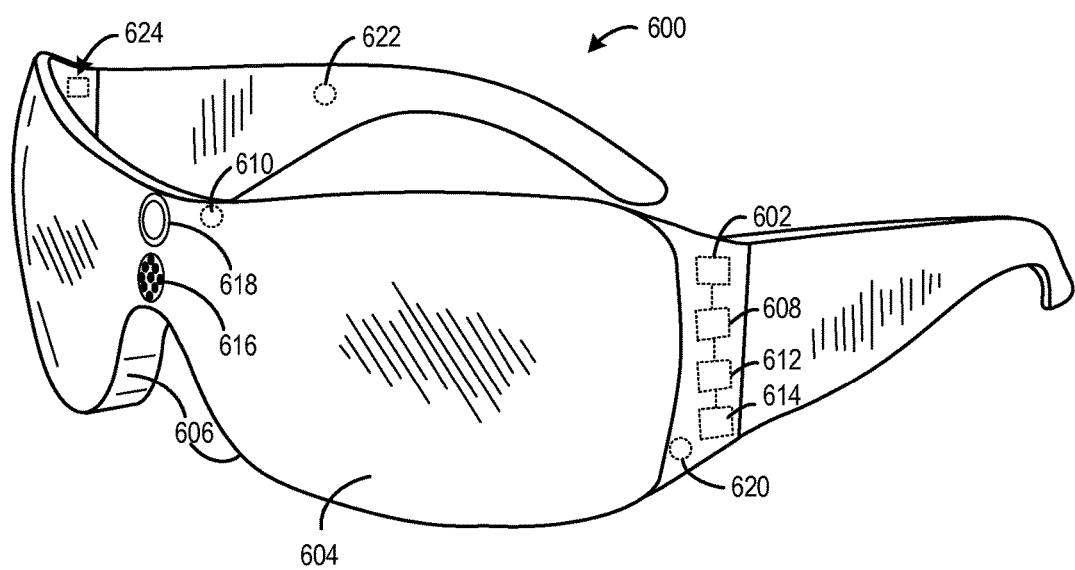
FIG. 6 is a schematic illustration an example head-mounted display device.

With reference now to FIG. 6, one example of an HMD device 600 in the form of a pair of wearable glasses with a transparent display is provided. It will be appreciated that in other examples, the HMD device 600 may take other suitable forms in which a transparent, semi-transparent, and/or non-transparent display is supported in front of a viewer's eye or eyes. It will also be appreciated that the HMD device shown in FIGS. 1 and 2 may take the form of the HMD device 600, as described in more detail below, or any other suitable HMD device.

The HMD device 600 includes a display system 602 and a see-through or transparent display 604 that enables images such as holographic objects to be delivered to the eyes of a wearer of the HMD device. The transparent display 604 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 604 to create an augmented reality environment.

The transparent display 604 may also be configured to enable a wearer of the HMD device to view a physical, real-world object in the physical environment through one or more partially transparent pixels that are displaying a virtual object representation. As shown in FIG. 6, in one example the transparent display 604 may include image-producing elements located within lenses 606 (such as, for example, a see-through Organic Light-Emitting Diode (OLED) display). As another example, the transparent display 604 may include a light modulator on an edge of the lenses 606. In this example, the lenses 606 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 600 may also include various sensors and related systems. For example, the HMD device 600 may include a gaze tracking system 608 that includes one or more image sensors configured to acquire image data in the form of gaze tracking data from a wearer's eyes. Provided the wearer has consented to the acquisition and use of this information, the gaze tracking system 608 may use this information to track a position and/or movement of the wearer's eyes.

In one example, the gaze tracking system 608 includes a gaze detection subsystem configured to detect a direction of gaze of each eye of a wearer. The gaze detection subsystem may be configured to determine gaze directions of each of a wearer's eyes in any suitable manner. For example, the gaze detection subsystem may comprise one or more light sources, such as infrared light sources, configured to cause a glint of light to reflect from the cornea of each eye of a wearer. One or more image sensors may then be configured to capture an image of the wearer's eyes.

Images of the glints and of the pupils as determined from image data gathered from the image sensors may be used to determine an optical axis of each eye. Using this information, the gaze tracking system 608 may then determine a direction the wearer is gazing. The gaze tracking system 608 may additionally or alternatively determine at what physical or virtual object the wearer is gazing, and at what location on such physical or virtual object the wearer is gazing. Such gaze tracking data may then be provided to the HMD device 600.

It will also be understood that the gaze tracking system 608 may have any suitable number and arrangement of light sources and image sensors. For example and with reference to FIG. 6, the gaze tracking system 608 of the HMD device 600 may utilize at least one inward facing sensor 610.

The HMD device 600 may also include sensor systems that receive physical environment data from the physical environment. For example, the HMD device 600 may also include a head tracking system 612 that utilizes one or more pose sensors, such as pose sensors 614 on HMD device 600, to capture head pose data and thereby enable position tracking, direction/location and orientation sensing, and/or motion detection of the wearer's head.

In one example, head tracking system 612 may comprise an inertial measurement unit (IMU) configured as a three-axis or three-degree of freedom position sensor system. This example position sensor system may, for example, include three gyroscopes to indicate or measure a change in orientation of the HMD device 600 within 3D space about three orthogonal axes (e.g., x, y, and z, or roll, pitch, and yaw). In some examples, the orientation derived from the sensor signals of the IMU may be used to display, via the transparent display 604, one or more virtual objects with a body-locked position in which the position of each virtual object appears to be fixed relative to the wearer of the see-through display and the position of each virtual object appears to be moveable relative to real-world objects in the physical environment.

In another example, head tracking system 612 may comprise an IMU configured as a six-axis or six-degree of freedom position sensor system. This example position sensor system may, for example, include three accelerometers and three gyroscopes to indicate or measure a change in location of the HMD device 600 along the three orthogonal axes and a change in device orientation about the three orthogonal axes.

The head tracking system 612 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 600 may also include an optical sensor system that utilizes one or more outward facing sensors, such as optical sensor 616 on HMD device 600, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment.

For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 618. It will be appreciated that any other suitable depth camera may be used within the scope of the present disclosure.

The outward facing sensor(s) may capture images of the physical environment in which a wearer of the HMD device is situated. With respect to the HMD device 600, in one example an augmented reality display program may include a 3D modeling system that uses such captured images to generate a virtual environment that models the physical environment surrounding the wearer of the HMD device. In some examples, the optical sensor 616 may cooperate with the IMU to determine the location and the orientation of the HMD device 600 in six degrees of freedom. Such location and orientation information may be used to display, via the transparent display 604, one or more virtual objects with a world-locked position in which a position of each virtual object appears to be fixed relative to real-world objects viewable through the transparent display, and the position of each virtual object appears to be moveable relative to a wearer of the see-through display.

The HMD device 600 may also include a microphone system that includes one or more microphones, such as microphone 620, that capture audio data. In other examples, audio may be presented to the wearer via one or more speakers, such as speaker 622 on the HMD device 600.

The HMD device 600 may also include a controller, such as controller 624. The controller 624 may include a logic subsystem and a storage subsystem, as discussed in more detail below with respect to FIG. 8, that are in communication with the various sensors and systems of the HMD device 600. In one example, the storage subsystem may include instructions that are executable by the logic subsystem to receive signal inputs from the sensors, determine a pose of the HMD device 600, and adjust display properties for content displayed via the transparent display 604.

Figure 7B:
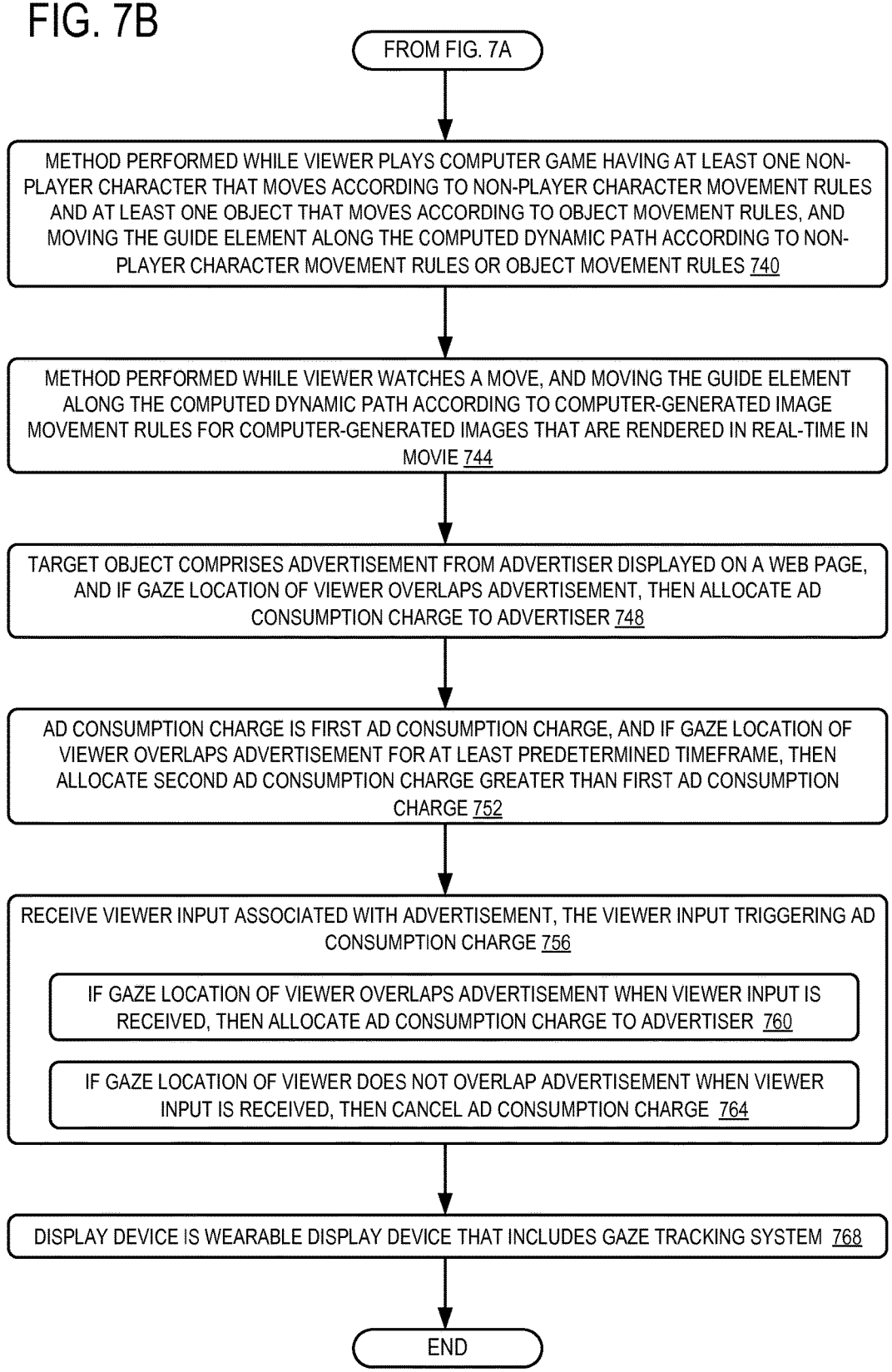

FIGS. 7A and 7B illustrate a flow chart of a method 700 for attracting a gaze of a viewer of a display device according to an implementation of the present disclosure. The following description of method 700 is provided with reference to the software and hardware components described above and shown in FIGS. 1-6. It will be appreciated that method 700 may also be performed in other contexts using other suitable hardware and software components.

With reference to FIG. 7A, at 704 the method 700 may include controlling the display device to display a target object. At 708 the method 700 may include using gaze tracking data from a gaze tracking system to monitor a gaze location of the viewer. At 712 the method 700 may include controlling the display device to display a guide element moving along a computed dynamic path that traverses within a predetermined region adjacent to the gaze location of the viewer and leads to the target object.

At 716 the method 700 may include using the gaze tracking data to determine if the gaze location of the viewer is within a predetermined divergence threshold of the guide element. At 720 the method 700 may include, if the gaze location of the viewer is within the predetermined divergence threshold of the guide element, then controlling the display device to continue displaying the guide element moving along the computed dynamic guide path to the target object. At 724 the method 700 may include, if the gaze location of the viewer diverts from the guide element by at least the predetermined divergence threshold, then controlling the display device to discontinue displaying the guide element moving along the computed dynamic guide path to the target object.

At 728, discontinuing displaying the guide element moving along the computed dynamic guide path to the target object may include diverting the guide element from the computed dynamic path. At 732, discontinuing displaying the guide element moving along the computed dynamic guide path to the target object may include ceasing to display the guide element. At 736, the predetermined divergence threshold comprises a distance from the guide element. At 738, the predetermined divergence threshold comprises a path divergence threshold from the computed dynamic path, and the method 700 may include determining if a gaze trajectory of the viewer diverts from the computed dynamic path by at least the path divergence threshold. If the gaze trajectory of the viewer diverts from the computed dynamic path by at least the path divergence threshold, then the display device may be controlled to discontinue displaying the guide element moving along the computed dynamic guide path to the target object as discussed above.

With reference now to FIG. 7B, at 740 and where the method 700 is performed while the viewer plays a computer game, with the computer game having at least one non-player character that moves according to non-player character movement rules, and at least one object that moves according to object movement rules, controlling the display device to display the guide element may further comprise moving the guide element along the computed dynamic path according to the non-player character movement rules or the object movement rules. At 744 and where the method is performed while the user watches a movie, controlling the display device to display the guide element may further comprise moving the guide element along the computed dynamic path according to computer-generated image movement rules for computer-generated images that are rendered in real-time in the movie.

At 748 and where the target object comprises an advertisement from an advertiser displayed on the display device, the method 700 may further comprise, if the gaze location of the viewer overlaps the advertisement, allocating an ad consumption charge to the advertiser. At 752 and where the ad consumption charge is a first ad consumption charge, the method 700 may further comprise, if the gaze location of the viewer overlaps the advertisement for at least a predetermined timeframe, allocating a second ad consumption charge that is greater than the first ad consumption charge.

At 756, where the target object comprises an advertisement from an advertiser displayed on a web page, the method 700 may include receiving a viewer input associated with the advertisement, with the viewer input triggering an ad consumption charge. At 760, if the gaze location of the viewer overlaps the advertisement on the web page when the viewer input is received, then the method 700 may include allocating the ad consumption charge to the advertiser. At 764, if the gaze location of the viewer does not overlap the advertisement on the web page when the viewer input is received, then the method 700 may include canceling the ad consumption charge. At 768 the display device may comprise a wearable display device that includes a gaze tracking system.

It will be appreciated that method 700 is provided by way of example and is not meant to be limiting. Therefore, it is to be understood that method 700 may include additional and/or alternative steps than those illustrated in FIGS. 7A and 7B. Further, it is to be understood that method 700 may be performed in any suitable order. Further still, it is to be understood that one or more steps may be omitted from method 700 without departing from the scope of this disclosure.

Figure 8:
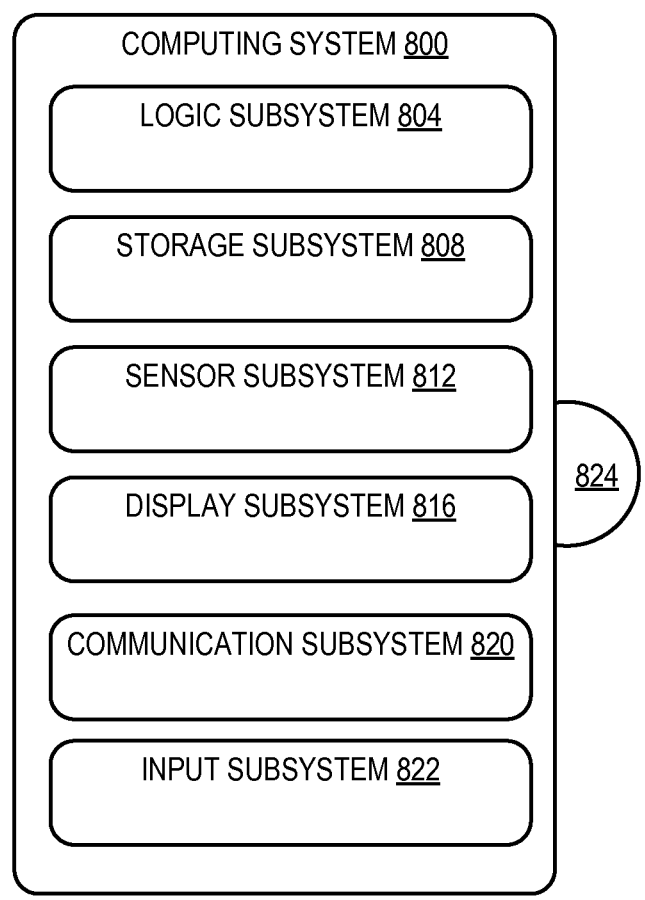
FIG. 8 is a simplified schematic illustration of an example of a computing device.

FIG. 8 schematically shows a nonlimiting example of a computing system 800 that may perform one or more of the above described methods and processes. Computing device 10 and computing device 12 may take the form of or include one or more aspects of computing system 800. Computing system 800 is shown in simplified form. It is to be understood that virtually any computer architecture may be used without departing from the scope of this disclosure. In different examples, computing system 800 may take the form of a mainframe computer, server computer, desktop computer, tablet computer, home entertainment computer, network computing device, tablet, notebook, smartphone, or other mobile computing device, mobile communication device, gaming device, etc.

As shown in FIG. 8, computing system 800 includes a logic subsystem 804 and a storage subsystem 808. Computing system 800 may optionally include a sensor subsystem 812, display subsystem 816, communication subsystem 820, input subsystem 822 and/or other subsystems and components not shown in FIG. 8. Computing system 800 may also include computer readable media, with the computer readable media including computer readable storage media and computer readable communication media. Computing system 800 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 804 may include one or more physical devices configured to execute one or more instructions. For example, the logic subsystem 804 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 804 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 808 may include one or more physical, persistent devices configured to hold data and/or instructions executable by the logic subsystem 804 to implement the herein described methods and processes. When such methods and processes are implemented, the state of storage subsystem 808 may be transformed (e.g., to hold different data).

Storage subsystem 808 may include removable media and/or built-in devices. Storage subsystem 808 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 808 may include devices with one or more of the following characteristics: volatile, nonvolatile, dynamic, static, read/write, read-only, random access, sequential access, location addressable, file addressable, and content addressable.

In some examples, aspects of logic subsystem 804 and storage subsystem 808 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 8 also shows an aspect of the storage subsystem 808 in the form of removable computer readable storage media 824, which may be used to store data and/or instructions executable to implement the methods and processes described herein. Removable computer-readable storage media 824 may take the form of CDs, DVDs, HD-DVDs, Blu-Ray Discs, EEPROMs, and/or floppy disks, among others.

It is to be appreciated that storage subsystem 808 includes one or more physical, persistent devices. In contrast, in some implementations aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, sensor subsystem 812 may include one or more sensors configured to sense different physical phenomenon (e.g., visible light, infrared light, sound, acceleration, orientation, position, etc.) as described above. Sensor subsystem 812 may be configured to provide sensor data to logic subsystem 804, for example. Such data may include gaze tracking information, image information, ambient lighting information, depth information, audio information, position information, motion information, user location information, and/or any other suitable sensor data that may be used to perform the methods and processes described above.

When included, display subsystem 816 may be used to present a visual representation of data held by storage subsystem 808. As the above described methods and processes change the data held by the storage subsystem 808, and thus transform the state of the storage subsystem, the state of the display subsystem 816 may likewise be transformed to visually represent changes in the underlying data. The display subsystem 816 may include one or more display devices utilizing virtually any type of technology. Such display devices may be combined with logic subsystem 804 and/or storage subsystem 808 in a shared enclosure, or such display devices may be peripheral display devices.

When included, communication subsystem 820 may be configured to communicatively couple computing system 800 with one or more networks and/or one or more other computing devices. Communication subsystem 820 may include wired and/or wireless communication devices compatible with one or more different communication protocols. As nonlimiting examples, the communication subsystem 820 may be configured for communication via a wireless telephone network, a wireless local area network, a wired local area network, a wireless wide area network, a wired wide area network, etc. In some embodiments, the communication subsystem may allow computing system 800 to send and/or receive messages to and/or from other devices via a network such as the Internet.

When included, input subsystem 822 may comprise or interface with one or more sensors or user-input devices such as a game controller, gesture input detection device, voice recognizer, inertial measurement unit, keyboard, mouse, or touch screen. In some embodiments, the input subsystem 822 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of computing device 10 and computing device 12 that is implemented to perform one or more particular functions. In some cases, such a program may be instantiated via logic subsystem 804 executing instructions held by storage subsystem 808. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for attracting a gaze of a viewer of a display device, the method comprising:
controlling the display device to display a target object;
via a gaze tracking system, obtaining gaze tracking data of the viewer;
using the gaze tracking data from the gaze tracking system to monitor a gaze location of the viewer;
controlling the display device to display a guide element moving along a computed dynamic path that traverses within a predetermined region adjacent to the gaze location of the viewer and leads to the target object;
using the gaze tracking data to determine if the gaze location of the viewer is within a predetermined divergence threshold of the guide element;
if the gaze location of the viewer is within the predetermined divergence threshold of the guide element, then controlling the display device to continue displaying the guide element moving along the computed dynamic path to the target object; and
if the gaze location of the viewer diverts from the guide element by at least the predetermined divergence threshold, then controlling the display device to discontinue displaying the guide element moving along the computed dynamic path to the target object.

2. The method of claim 1, wherein controlling the display device to discontinue displaying the guide element moving along the computed dynamic path further comprises either diverting the guide element from the computed dynamic path or ceasing to display the guide element.

3. The method of claim 1, wherein the predetermined divergence threshold comprises a distance from the guide element.

4. The method of claim 1, wherein using the gaze tracking data to determine if the gaze location of the viewer is within a predetermined divergence threshold of the guide element further comprises determining if a gaze trajectory of the viewer is within a path divergence threshold of the computed dynamic path.

5. The method of claim 1, wherein the method is performed while the viewer plays a computer game, the computer game has at least one non-player character that moves according to non-player character movement rules, and at least one object that moves according to object movement rules, and controlling the display device to display the guide element further comprises moving the guide element along the computed dynamic path according to the non-player character movement rules or the object movement rules.

6. The method of claim 1, wherein the method is performed while the user watches a movie, and controlling the display device to display the guide element further comprises moving the guide element along the computed dynamic path according to computer-generated image movement rules for computer-generated images that are rendered in real-time in the movie.

7. The method of claim 1, wherein the target object comprises an advertisement from an advertiser displayed on the display device, the method further comprising:
if the gaze location of the viewer overlaps the advertisement, then allocating an ad consumption charge to the advertiser.

8. The method of claim 7, wherein the ad consumption charge is a first ad consumption charge, and the method further comprises, if the gaze location of the viewer overlaps the advertisement for at least a predetermined timeframe, then allocate a second ad consumption charge that is greater than the first ad consumption charge.

9. The method of claim 1, wherein the target object comprises an advertisement from an advertiser displayed on a web page, the method further comprising:
receiving a viewer input associated with the advertisement, the viewer input triggering an ad consumption charge;
if the gaze location of the viewer overlaps the advertisement on the web page when the viewer input is received, then allocating the ad consumption charge to the advertiser; and
if the gaze location of the viewer does not overlap the advertisement on the web page when the viewer input is received, then canceling the ad consumption charge.

10. The method of claim 1, wherein the display device is a wearable display device that includes the gaze tracking system.

11. A computing device for attracting a gaze of a viewer of a display device, the computing device comprising:
a gaze tracking system configured to acquire gaze tracking data of the viewer;
a gaze attraction program executed by a processor of the computing device, the gaze attraction program configured to:
control the display device to display a target object;
monitor a gaze location of the viewer using the gaze tracking data from the gaze tracking system;
control the display device to display a guide element moving along a computed dynamic path that traverses within a predetermined region adjacent to the gaze location of the viewer and leads to the target object;
using the gaze tracking data, determine if a gaze trajectory of the viewer is within a path divergence threshold of the computed dynamic path;
if the gaze location of the viewer is within the path divergence threshold of the computed dynamic path, then control the display device to continue displaying the guide element moving along the computed dynamic path to the target object; and
if the gaze location of the viewer diverts from the computed dynamic path by at least the path divergence threshold, then control the display device to discontinue the guide element moving along the computed dynamic path.

12. The computing device of claim 11, wherein the gaze attraction program is further configured to move the guide element along the computed dynamic path according to non-player character movement rules that govern movement of non-player characters in a computer game which the viewer is playing, or according to object movement rules that govern movement of objects in the computer game.

13. The computing device of claim 11, wherein the gaze attraction program is further configured to move the guide element along the computed dynamic path according to computer-generated image movement rules for computer-generated images that are rendered in real-time in a movie which the viewer is watching.

14. The computing device of claim 11, wherein the target object comprises an advertisement from an advertiser displayed on the display device, and the gaze attraction program is further configured to, if the gaze location of the viewer overlaps the advertisement, allocate an ad consumption charge to the advertiser.

15. The computing device of claim 14, wherein the ad consumption charge is a first ad consumption charge, and the gaze attraction program is further configured to, if the gaze location of the viewer overlaps the advertisement for at least a predetermined timeframe, allocate a second ad consumption charge that is greater than the first ad consumption charge.

16. The computing device of claim 11, wherein the target object comprises an advertisement from an advertiser displayed on a web page, and the gaze attraction program is further configured to:
receive a viewer input associated with the advertisement displayed on the web page, the viewer input triggering an ad consumption charge;
if the gaze location of the viewer overlaps the advertisement on the web page when the viewer input is received, then allocate the ad consumption charge to the advertiser; and
if the gaze location of the viewer does not overlap the advertisement on the web page when the viewer input is received, then cancel the ad consumption charge.

17. The computing device of claim 11, wherein the computing device is integrated into a wearable display device that includes the gaze tracking system.

18. The computing device of claim 11, wherein the computing device shares a common enclosure with the gaze tracking system, and the computing device does not share a common enclosure with the display device.

19. The computing device of claim 11, wherein the computing device, the gaze tracking system and the display device share a common enclosure.

20. In a head-mounted display device worn by a viewer, a method for attracting a gaze of the viewer, the method comprising:
controlling the head-mounted display device to display a target object;
via a gaze tracking system of the head-mounted display device, obtaining gaze tracking data of the viewer;
using the gaze tracking data from the gaze tracking system of the head-mounted display device to monitor a gaze location of the viewer;
controlling the head-mounted display device to display a guide element moving along a computed dynamic path that traverses within a predetermined region adjacent to the gaze location of the viewer and leads to the target object;
using the gaze tracking data to determine if a gaze trajectory of the viewer is within a path divergence threshold of the computed dynamic path;
if the gaze trajectory of the viewer is within the path divergence threshold of the computed dynamic path, then controlling the head-mounted display device to continue displaying the guide element moving along the computed dynamic path to the target object; and
if the gaze trajectory of the viewer diverts from the computed dynamic path by at least the path divergence threshold, then controlling the head-mounted display device to discontinue displaying the guide element moving along the computed dynamic path to the target object.

* * * * *